No. 734,245. PATENTED JULY 21, 1903.
J. E. SMITH.
OVEN.
APPLICATION FILED NOV. 4, 1897.
NO MODEL. 2 SHEETS—SHEET 2.

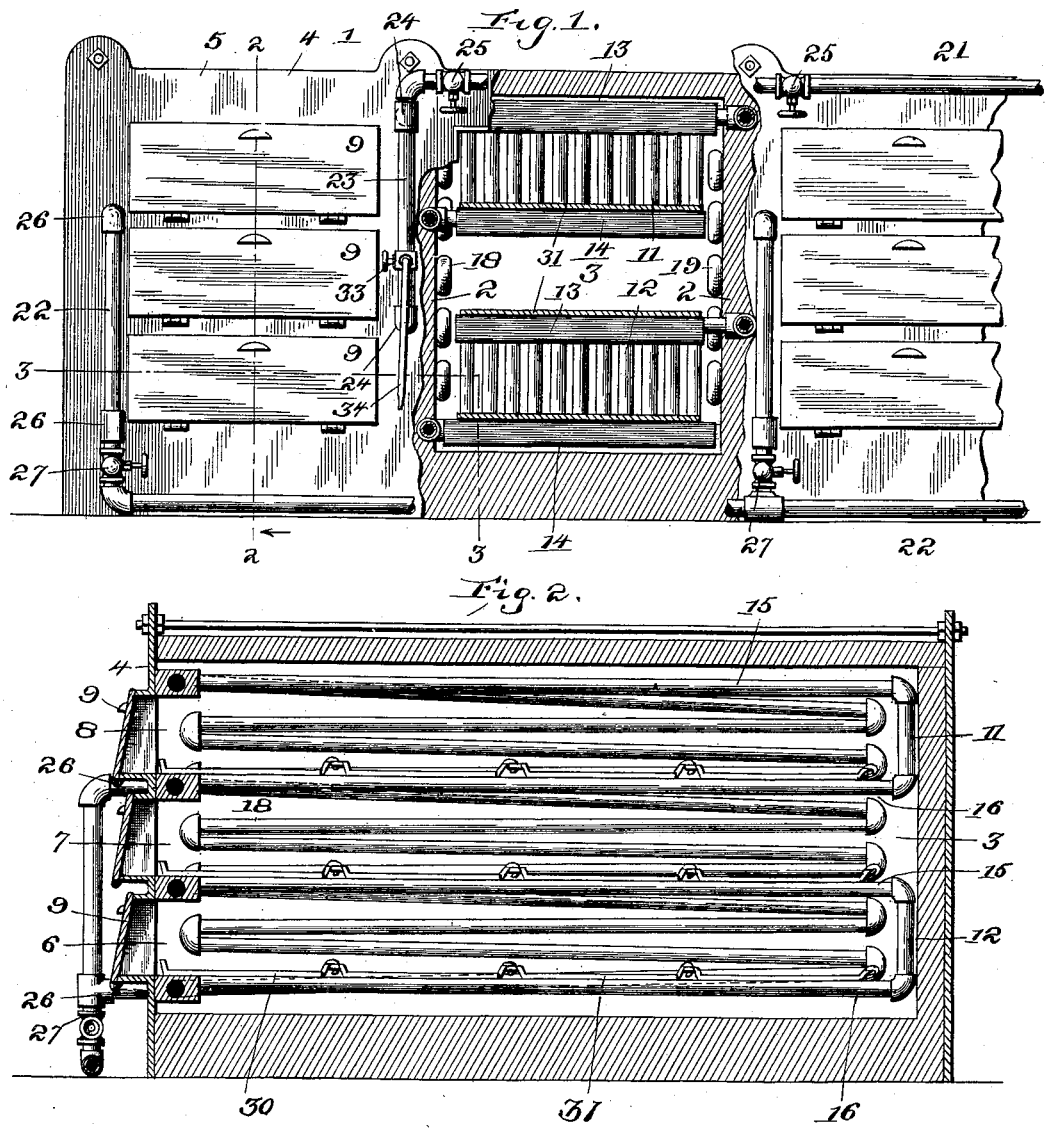

Witnesses
Inventor
James E. Smith
By Edson Bro's
Attorneys

No. 734,245. Patented July 21, 1903.

UNITED STATES PATENT OFFICE.

JAMES EDWARD SMITH, OF NEW YORK, N. Y.

OVEN.

SPECIFICATION forming part of Letters Patent No. 734,245, dated July 21, 1903.

Application filed November 4, 1897. Serial No. 657,420. (No model.)

*To all whom it may concern:*

Be it known that I, JAMES EDWARD SMITH, a citizen of the United States, residing at New York, in the county of New York and State of New York, have invented certain new and useful Improvements in Ovens; and I do hereby declare the following to be a full, clear, and exact description of the invention, such as will enable others skilled in the art to which it appertains to make and use the same.

My invention relates to improvements in ovens for bakeries in which I employ steam heat for the purpose of heating to the required temperature each of a series of oven-chambers forming a part of the system or plant of a bakery.

The employment of direct-heating appliances for bakers' ovens is open to the serious objection due to the presence of the gaseous products of combustion in the oven-chamber, which of course contaminates the bread or other edibles undergoing the baking process, besides otherwise rendering the oven unwholesome and more or less uncleanly, besides which the heat is difficult of control and producing imperfectly-baked food. By the substitution of steam in a novel arrangement of coils as the medium for heating the oven-chambers I overcome the objections named and secure a uniform heating of the oven-chamber in which bread may be uniformly baked, besides contributing to the cleanliness and wholesomeness of the product.

The leading object that I have in view is to provide an apparatus in which novel steam-heating appliances are provided for the purpose of economically raising to the necessary temperature one or a series of oven-chambers.

A further object of the invention is to provide a means by which the bread or other substance may be quickly and easily charged with a minimum amount of labor on the part of the operator into an oven-chamber and in like manner withdrawn therefrom, the operation of charging and discharging the oven being effected within a few minutes' time, so as to reduce to a minimum the exposure of the oven-chamber to the admission of outside air and consequent cooling off of the oven and the loss of heat due thereto.

To the attainment of these ends my invention consists in the novel combination of elements and in the construction and arrangement of parts, which will be hereinafter fully described and claimed.

To enable others to understand my invention, I have illustrated the same in the accompanying drawings, forming a part of this specification, and in which—

Figure 3:
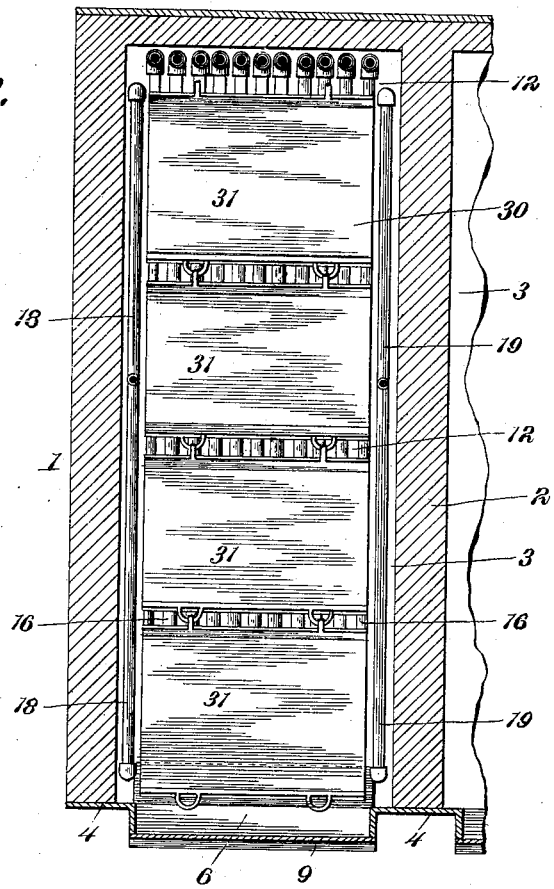
Figure 6:
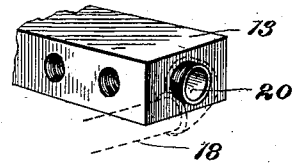
Figure 5:
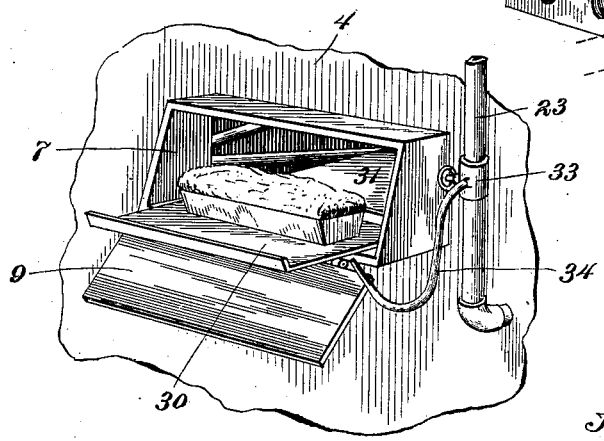

Figure 1 is a view, partly in front elevation and partly in transverse section, of a part of a steam baking-oven embodying my invention. Fig. 2 is a vertical sectional view through one of the oven-chambers on the plane indicated by the dotted line 2 2 of Fig. 1. Fig. 3 is a horizontal sectional view on the plane indicated by the dotted line 3 3 of Fig. 1. Fig. 4 is a detail view of one of the oven-bottoms, illustrating the sectional detachable construction thereof. Fig. 5 is a detail sectional view, on an enlarged scale, showing the means for spraying the bread on its removal from the oven-chamber. Fig. 6 is a fragmentary detail perspective view of one of the headers, showing by dotted lines the connection of one of the side heaters to said header.

Like numerals of reference denote like parts in all the figures of the drawings.

I construct my oven of brickwork or in any suitable manner to provide a casing or structure 1, which is divided by a series of transverse partition-walls 2 2 into a series of oven-chambers 3 3, each of which is or may be of equal area or capacity. The front box 4 of the oven is preferably of metallic construction, one section 5 of the front serving to close each of the oven-chambers, and each front section being secured removably in place—as, for instance, by bolts—so that the front may be removed to permit access to be obtained to the proper oven-chamber to draw out the heating appliances or to repair and inspect the same. Each oven-chamber of the series provided in the structure and the front section 5 therefor is substantially the same in construction, and a description of one chamber and front section will apply equally to every other chamber and front section provided in the structure. I construct each section 5 of the metallic front 4 with a series of door-openings 6, 7, and 8, preferably three in number, and each opening is closed by a door 9, hinged to the front section 5 in a manner to drop down and open outwardly. Each door is so hung and arranged as to overbalance itself and close itself when turned up, such overbalancing of the door tending to keep it closed.

The oven-chamber 3 is equipped with novel heating appliances by which the chamber is heated thoroughly and uniformly, and such heating appliances, while embracing sufficient area or surface for the purpose of heating the oven-chamber up to the temperature necessary for the successful baking, 225° Fahrenheit, are arranged compactly in the oven-chamber, so as to be entirely out of the way, and do not interfere with the proper placement of the bread therein or its removal therefrom.

I provide a plurality of heating appliances, certain of which occupy the central space of the oven-chamber, while other appliances occupy the opposite sides of the oven-chamber. The heating appliances at the central part of the chamber are arranged to form the supports for the oven-bottom plates, so that the dough is exposed to the heat from above and below the pipes. In my oven-chamber shown by the drawings I provide two heaters, (indicated generally at 11 12 and arranged one above or below the other,) and each heater consists of the two headers 13 14, an upper series of pipes 15, and a lower series of pipes 16. The heaters extend longitudinally of the oven-chamber, and the headers and pipes of each heater are arranged in such relation to one of the doors that the dough may readily be introduced therein and the bread withdrawn therefrom. I arrange the headers 13 14 of each heater in close relation to one of the doors, so that the upper header is flush with the top edge of the door-opening, while the lower header is flush with the bottom edge of said door-opening, and from these headers extend the upper and lower series of pipes 15 16. These upper and lower series of pipes 15 16 are attached or joined to their respective headers in a suitable way, and the rear ends of the pipes are coupled together by suitable elbows or couplings. It will be understood that the lower heater 11 is arranged in line with the lower door 6, and that the upper heater 12 is in line with the upper door 8; but I prefer to omit a heater opposite to the middle door 7, because the upper pipes 15 of the lower heater 11 form the support for the dough introduced through the middle door 7, while the lower series of pipes 16 for the upper heater 12 serve to radiate heat upon top of the dough resting on the upper series of pipes of the lower heater.

It will be observed that the pipes of each heater are arranged to provide for the circulation of steam from the upper header through the pipes to the lower header, and thus direct the steam back and forth through the oven-chamber, and, furthermore, it will be seen that the dough is contained between the upper and lower series of pipes, so that it is exposed to heat both from below and above, thus exposing the dough to uniform heat.

The side heaters in each oven-chamber are indicated at 18 19 as being arranged at the side walls of the oven-chamber and on opposite sides of the heaters 11 12, and consequently out of the way of the baking-pans as they are introduced in or withdrawn from the oven-chamber. Each side heater consists of a series of pipes arranged in inclined position in alternate order, and the upper pipe of each side heater is attached by a nipple 20 to the end of the upper header 13 of the upper heater 11, while the lower end of the bottom pipe of each side heater is attached to the end of the bottom header 14 of the lower heater 12, thus providing for the back-and-forth circulation of steam through the side heaters and for the passage of water of condensation to the return-pipe to the boiler.

21 designates the feed-pipe for the live steam, and 22 is the return-pipe to the boiler. From the feed-pipe 21 leads a branch pipe 23 to each oven-chamber of the series of oven-chambers, and each branch pipe is connected by short lengths of pipe 24 24 to the top headers 13 of the two heaters 11 12, thus insuring the proper supply of live steam to the top heaters and to the side heaters 18 19 in each oven-chamber. Each branch pipe 24 to each oven-chamber is situated close to the doors therein, and said pipe is equipped with a cut-off valve 25, which may be closed to shut off steam to the heating appliances in each oven-chamber, so that the latter may be thrown out of service whenever desired—as, for instance, when it is necessary to inspect or repair the oven-chamber or to reduce the number of oven-chambers in service.

The connections to the return-pipe 22 from each oven-chamber are effected by a branch pipe 26, which has short lengths of pipe connected to the lower headers 14 14 of the upper and lower heaters 11 and 12, and said branch pipe is also equipped with a shut-off valve 27, which may be closed when it is desired to cut the oven-chamber out of service and to prevent back pressure of the water in the return-pipe from blowing into the heating appliances in one of the oven-chambers which may be out of use.

I also provide means by which the dough may be easily and quickly placed in the oven-chamber and in like manner withdrawn therefrom without undue loss of heat and cooling of one chamber. To this end I employ a sectional oven plate or bottom 30, one for each door, or a series of three plates for each oven-chamber. Each oven plate or bottom 30 consists of a series of two or more sections 31, detachably connected together, as by interlocking hooks and eyes on the adjacent ends of the plate-sections or by other suitable means. Each plate 30 may thus be lengthened or shortened, according to the number of loaves of bread it is desired to bake in the oven-chamber, and the oven-plate thus provides for the ready charging of the oven-chamber, because a number of loaves may be placed on each section of the plate, so that all the loaves may be run into the oven or withdrawn therefrom at one operation, thus saving the time and labor which is now rendered necessary in ordinary bakeries by the use of the "peel," which requires the separate handling of each article. In charging the oven the dough is placed on the sectional bottom, which rests on a table adjacent to the oven, and a run-board is placed between the table and the oven-chamber. When the door is opened, the oven-plate with its load is shoved quickly into the chamber to rest on the pipes of the heater flush with the door, thus charging the oven at one operation. The bread may be removed by withdrawing the oven-plate therefrom, and thus it is not necessary to keep the door open for any length of time or to open and close the door a number of times for the insertion or removal of the articles to be baked.

I also provide means for spraying the loaves of bread as they are withdrawn from the oven in order to impart to the bread a glossy appearance. Another advantage of my improved sprayer resides in its adaptation to spray the dough as it is introduced into the oven-chamber for the purpose of preventing the dough from having crevices formed therein and of the crust of the loaf of bread from cracking. It is evident that as the dough is introduced into the oven it may be subjected to the action of the steam-spray, and moisture is thus supplied to the dough, with the result that when the loaf of bread is baked the crust is not cracked. This means consists in the provision in each branch 23 of the live-steam pipe of a petcock or valve 33 and a spraying hose or tube 34, which is attached to the valve. By opening valve or cock steam may be admitted to the hose, and the latter may be adjusted or handled to direct the steam in a spray over the bread while the latter is in a heated condition as it is withdrawn from the oven-chamber. The described means provides for spraying the loaves of bread, which may be withdrawn from either of the doors 6, 7, or 8 of the oven-chamber, because the hose or tube may be adjusted to direct the steam-spray over the bread as it is drawn from either of the doors. Such steam-spraying means wholly obviates the necessity for applying by a sponge or cloth moisture to the bread, as is commonly practiced when it is desired to give a gloss to the surface of the loaves of bread.

It is thought that the operation of the improved oven will be readily understood from the foregoing description, taken in connection with the drawings.

While I have described my invention as especially adapted for use in baking bread, it will be understood that the oven is equally well adapted for baking other foods, such as cakes, pastries, and the like. In fact, the oven may be used advantageously in baking some kinds of bread which require subjection to heat for quite a long period, and in this connection I would state that bread of this kind should be placed in the upper part of the oven-chamber, which is naturally the hottest part of the chamber owing to the tendency of the heat to rise and accumulate therein.

Having thus fully described my invention, what I claim as new, and desire to secure by Letters Patent, is—

1. A steam bake-oven comprising an oven-chamber, the horizontal tiers of pipes arranged in the oven-chamber, forming a series of heaters and shelves arranged longitudinally of said chamber and situated in planes between the vertical series to said chamber, the side heaters arranged in pairs and connected with each of the horizontal heaters, and a plurality of oven-plates each series of which are flexibly connected and adapted to be slid endwise upon one of the horizontal heaters and to occupy a position between the side heaters, as set forth.

2. A steam bake-oven comprising an oven-chamber having a vertical series of doors, horizontal tiers of pipes situated in said chamber in the intervals between the doors and subdividing the chamber into a series of compartments by the provision of a series of longitudinal heaters, each heater having upper and lower headers and two series of pipes attached to said headers to insure the continuous circulation of steam, and a plurality of series of connected oven-plates, each of which fits slidably upon one of horizontal heaters, as set forth.

3. A steam baking-oven having a series of door-openings in the oven-front, a series of doors hinged to the front to close said openings, a series of headers supported in the oven-chamber in substantially flush relation to the door-openings thereof, horizontal tiers of connected pipes united to said headers and forming the floors and roofs of a series of oven-compartments, and side heaters also attached to the headers and disposed at the sides of the oven-compartments.

4. A steam baking-oven having a series of door-openings in the front thereof, a series of horizontal transverse headers located in the oven-chamber in substantially flush relation to the door-openings, horizontal tiers of pipes connected in series at the rear of the oven-chamber and attached to the headers to form the floors and roofs of a series of oven-compartments, doors to close the openings, and side heaters disposed on opposite sides of the oven-compartments and of the tiers of horizontal pipes, each side heater being connected at its end portions to adjacent headers and having inclined connected members arranged to provide for the back-and-forth circulation of steam longitudinally of the oven-compartments.

5. In an oven, an oven-bottom plate comprising a series of flexibly and detachably connected sections each having flanges at opposite ends of its bottom, a series of hooks on one flange, and a series of keepers on the other flange, as set forth.

6. In a steam baking-oven, a front having a series of door-openings, a series of shelves extending outwardly from the front at the lower edges of the door-openings, a series of doors each hinged at its lower edge to one shelf and arranged to open downwardly and to assume inclined positions when closed, and heaters within the oven-chamber and provided with headers which are substantially flush with the shelves on the front.

In testimony whereof I affix my signature in presence of two witnesses.

JAMES EDWARD SMITH.

Witnesses:
JOSEPH R. EDSON,
J. F. H. MOTHERSHEAD.